United States Patent
Chopra et al.

(10) Patent No.: US 9,917,774 B2
(45) Date of Patent: Mar. 13, 2018

(54) CONTENT CACHING IN METRO ACCESS NETWORKS

(71) Applicant: Juniper Networks, Inc., Sunnyvale, CA (US)

(72) Inventors: Disha M. Chopra, Union City, CA (US); Sachin S. Natu, Fremont, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 234 days.

(21) Appl. No.: 14/984,903

(22) Filed: Dec. 30, 2015

(65) Prior Publication Data

US 2017/0093712 A1    Mar. 30, 2017

Related U.S. Application Data

(63) Continuation-in-part of application No. 14/871,886, filed on Sep. 30, 2015, now Pat. No. 9,794,174.

(51) Int. Cl.
*H04L 12/747* (2013.01)
*H04L 29/06* (2006.01)
(Continued)

(52) U.S. Cl.
CPC ............ *H04L 45/742* (2013.01); *H04L 12/46* (2013.01); *H04L 12/4633* (2013.01);
(Continued)

(58) Field of Classification Search
CPC ... H04L 45/742; H04L 45/66; H04L 12/4633; H04L 12/4641; H04L 29/089;
(Continued)

(56) References Cited

U.S. PATENT DOCUMENTS 8,909,736 B1    12/2014   Bosch et al.
9,391,885 B1 *   7/2016   Shukla ................... H04L 45/50
(Continued)

FOREIGN PATENT DOCUMENTS

WO         2012075448 A1    6/2012

OTHER PUBLICATIONS

RFC 7432—"BGP MPLS-Based Ethernet VPN", Feb. 2015.*
(Continued)

*Primary Examiner* — Andrew Chriss
*Assistant Examiner* — Ellen Kirillova
(74) *Attorney, Agent, or Firm* — Shumaker & Sieffert, P.A.

(57) ABSTRACT

Techniques are described that enable local caching of content data within metro transport networks for delivery to subscribers of ISPs that are connected to metro transport networks. Routers within the metro transport network, including an access router, ISP-facing provider edge routers and one or more caching routers, establish an EVPN within the metro transport network. The access router outputs, within the EVPN and to the caching routers, EVPN route advertisements that advertise network address reachability information of the subscriber devices on behalf of the ISPs. Responsive to subscriber content requests that have been redirected from the ISPs and based on the EVPN route advertisements from the access routers, the caching routers of the metro transport network forward, by the EVPN, content from the local content cache to the access routers for efficient delivery to the one or more of the subscribers.

12 Claims, 4 Drawing Sheets

(51) Int. Cl.
  *H04L 29/12* (2006.01)
  *H04L 12/46* (2006.01)
  *H04L 12/721* (2013.01)
  *H04L 29/08* (2006.01)

(52) U.S. Cl.
  CPC ........ *H04L 12/4641* (2013.01); *H04L 29/089* (2013.01); *H04L 29/08729* (2013.01); *H04L 45/66* (2013.01); *H04L 61/203* (2013.01); *H04L 61/6022* (2013.01); *H04L 65/1036* (2013.01)

(58) Field of Classification Search
  CPC ............. H04L 29/08729; H04L 61/203; H04L 61/6022; H04L 65/1036
  USPC .......................................................... 370/401
  See application file for complete search history.

(56) References Cited

U.S. PATENT DOCUMENTS

| | | | |
|---|---|---|---|
| 2007/0086429 | A1 | 4/2007 | Lawrence et al. |
| 2010/0043068 | A1 | 2/2010 | Varadhan et al. |
| 2012/0151057 | A1* | 6/2012 | Paredes ............... H04L 12/4641 709/225 |
| 2013/0148657 | A1* | 6/2013 | Salam .................... H04L 45/66 370/390 |
| 2013/0308646 | A1 | 11/2013 | Sajassi et al. |

OTHER PUBLICATIONS

Kompella et al., "Virtual Private Lan Service (VPLS) Using BGP for Auto-Discovery and Signaling," RFC 4761, Network Working Group, The Internet Society, Jan. 2007, 26 pp.

Sajassi et al., "BGP MPLS Based Ethernet VPN," RFC 7432, Internet Engineering Task Force (IETF), Feb. 2015, 56 pp.

Rabadan et al., "IP Prefix Advertisement in EVPN," Internet Engineering Task Force (IETF), draft-ietf-bess-evpn-prefixadvertisement-02, Mar. 9, 2015, 24 pp.

Zimmermann, H., "OSI Reference Model—the ISO Model of Architecture for Open Systems Interconnection," published in IEEE Transactions on Communications, vol. 28, No. 4, dated Apr. 1980, 8 pp.

U.S. Appl. No. 14/871,886, filed Sep. 30, 2015, by Natu, Sachin S.

Response to Communication pursuant to Rule 69 EPC dated Apr. 10, 2017, from counterpart European Application No. 16190866.0, filed Oct. 5, 2017, 25 pp.

Response to Extended Search Report dated Jan. 2, 2017, from counterpart European Application No. 16190897.5, filed Oct. 5, 2017, 26 pp.

Notice of Allowance from U.S. Appl. No. 14/871,886, dated Jun. 19, 2017, 15 pp.

Extended Search Report from counterpart European Application No. 16190866.0, dated Dec. 23, 2016, 12 pp.

Extended Search Report from counterpart European Application No. 16190897.5, dated Jan. 2, 2017, 16 pp.

\* cited by examiner

FIG. 1 –
PRIOR ART

CONTENT CACHING IN METRO ACCESS NETWORKS

This application is a continuation in part of U.S. application Ser. No. 14/871,886, filed Sep. 30, 2015, the entire contents of which is hereby incorporated by reference.

TECHNICAL FIELD

The invention relates to computer networks and, more specifically, to delivering content to subscribers over metro access networks.

BACKGROUND

Many metropolitan regions have installed metropolitan (metro) transport networks to provide high-bandwidth connectivity between local subscribers and their ISPs, onwards to a larger packet-based service network, such as the Internet. Each subscriber typically contracts with any of a number of Internet service provider (ISP) networks connected to the metro transport network, and each ISP network provides an anchor for communication sessions for the subscribers and manages network services for the subscribers such as authentication, accounting and billing. In this way, the metro transport network typically operates as an access network that provides high-speed layer two (L2) transport, such as Ethernet connectivity, between subscribers and their Internet service provider networks.

The subscribers may utilize a wide variety of devices to connect to the ISP networks to access resources and services provided by the Internet. For example, subscribers typically utilize desktop computers, laptop computers, mobile smart phones and feature phones, tablet computers, Smart TVs and the like. The metro transport network typically provides layer two (L2) switching mechanisms for transporting packet-based data between the subscribers and their respective ISPs such that IP (layer three—L3) communication sessions can be established for the subscribers at the ISPs for communicating with resources beyond the ISP, such as content data networks or the Internet.

SUMMARY

In general, techniques are described that enable local caching of content data within metro transport networks for direct delivery to subscribers of Internet service providers (ISPs) that are connected to metro transport networks. As described herein, the techniques enables ISPs and other content providers to utilize local content caches within a metro transport network to distribute content to the subscribers, thereby improving subscriber experience. The ISP networks, however, may retain ownership over IP services provided to the subscribers, including authentication, accounting and other services. In other words, even though IP services for a given client may be provided by and anchored by an ISP service provider upstream from a metro transport network operating as a high-speed access network for a given subscriber, the techniques described herein enable the ISP and other content providers to pre-load content downstream within the metro transport network for highly-efficient servicing of content requests from the subscribers. The techniques may, for example, be well suited for caches that use reverse proxy technique where content is pre-positioned in specific locations in the network to improve subscriber experience.

As described herein, edge switches/routers of a metro transport network implement Ethernet Virtual Private Network (EVPN) protocol that includes one or more caching provider edge (C-PE) routers as a member of the EVPN. ISPs and a metro carrier associated with the metro transport network collaborate such that the access edge routers of the EVPN advertise network address reachability information (e.g., IP prefixes of the ISPs or IP/MAC combinations) into the EVPN on behalf of the ISPs, where the advertisements specify that the network address information owned and used by the ISPs to provide IP services to subscribers are actually reachable through the access edge routers.

Moreover, the C-PE router is collocated with one or more local caches positioned within the metro transport network, and the C-PE router and/or any other router of the metro transport network announces the reachability of local caches to upstream Internet service providers, e.g., by way of an external BGP (E-BGP) routing session. In this way, the C-PEs share IP prefix reachability information of local caches within the metro transport network with upstream border routers of the ISP networks and content delivery networks (CDNs). As such, DNS servers or content servers within the ISPs can redirect subscriber content requests back downstream to the local caches within the metro transport network such that cached content can be delivered directly to the subscribers from the metro transport network. In this way, the techniques may enable content servers on an ISP or content data network to distribute cached content closest to the subscribers, thereby improving subscriber experience and satisfaction.

In one example, a system comprises a metro transport network positioned between a set of subscriber devices and at least one Internet service provider network that authenticates the subscriber devices and allocates the subscriber devices' respective Internet Protocol (IP) network addresses from a respective IP network address prefix assigned to the Internet service provider network. The metro transport network comprises at least one access router that is connected to the subscriber devices by one or more access links and at least one caching router that is coupled to a local content cache of the metro transport network. The metro transport network, including the access router and the caching router, establish an EVPN within the metro transport network and the access router outputs, within the EVPN and to the caching router, an EVPN route advertisement that advertises the IP network address prefix on behalf of the Internet service provider network. The EVPN route advertisement specifies the L3 network address prefix of the Internet service provider network and indicates that the IP network addresses allocated to the subscribers from the IP network address prefix of the Internet service provider network are reachable through the access router. The caching router of the metro transport network outputs a routing protocol route advertisement that advertises the network address reachability information of the local content cache of the metro transport network to a router of the Internet service provider network. Responsive to subscriber content requests that have been redirected from the Internet service provider network and based on the EVPN route advertisement from the access router, the caching router of the metro transport network forwards, by the EVPN, content from the local content cache to the access routers for delivery to the one or more of the subscribers.

In another example, a method comprises establishing an Ethernet Virtual Private Network (EVPN) within a metro transport network positioned between at least one Internet service provider network and a set of subscriber devices.

The metro transport network provides layer two (L2) packet switching for transporting network packets between the Internet service provider network and the subscriber devices. The Internet service provider network authenticates the subscriber devices and allocates the subscriber devices respective IP network addresses from an L3 network address prefix assigned to the Internet service provider network. The EVPN is established within the metro transport network by at least one access router/switch that is connected to the subscribers' devices by one or more access links and by at least one caching router that is coupled to a local content cache of the metro transport network. The method further comprises receiving, by the caching router of the EVPN and from the access router, an EVPN route advertisement that advertises the IP address (/32 host address) or an IP prefix on behalf of the Internet service provider network, wherein the EVPN route advertisement specifies the IP address/prefix of the Internet service provider network and indicates that the IP addresses allocated to the subscribers from the IP address pool/prefix of the Internet service provider network are reachable through the access router. The method further includes outputting, with the caching router of the metro transport network, a routing protocol route advertisement that advertises the network address reachability information of the local content cache of the metro transport network to a router of the Internet service provider network and, responsive to content requests redirected from the Internet service provider network and based on the EVPN route advertisement, forwarding, with the caching router of the metro transport network and by the EVPN, content from the local content cache to the access routers for delivery to one or more of the subscribers.

In another example, a caching router is positioned within a metro transport network located between at least one Internet service provider network and a set of subscriber devices. The caching router comprises a control unit having at least one processor coupled to a memory. The control unit executes software configured to establish an Ethernet Virtual Private Network (EVPN) with a caching router within the metro transport network. The control unit is configured to receive an EVPN route advertisement specifying an IP address or a prefix assigned to the Internet service provider network. The EVPN route advertisement specifies the IP address or a prefix of the Internet service provider network and indicates that the IP addresses allocated to the subscribers from the IP address pool/prefix of the Internet service provider network are reachable through an access router of the EVPN. The caching router of the metro transport network outputs a routing protocol route advertisement that advertises, to a router of the Internet service provider network, network address reachability information of a local content cache of the metro transport network. Responsive to content requests redirected from the Internet service provider network and based on the EVPN route advertisement, the caching router of the metro transport network forwards, by the EVPN, content from the local content cache to the access routers for delivery to the one or more of the subscribers.

In another example, a non-transitory computer-readable storage medium comprises executable instructions configured to perform the methods described herein.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
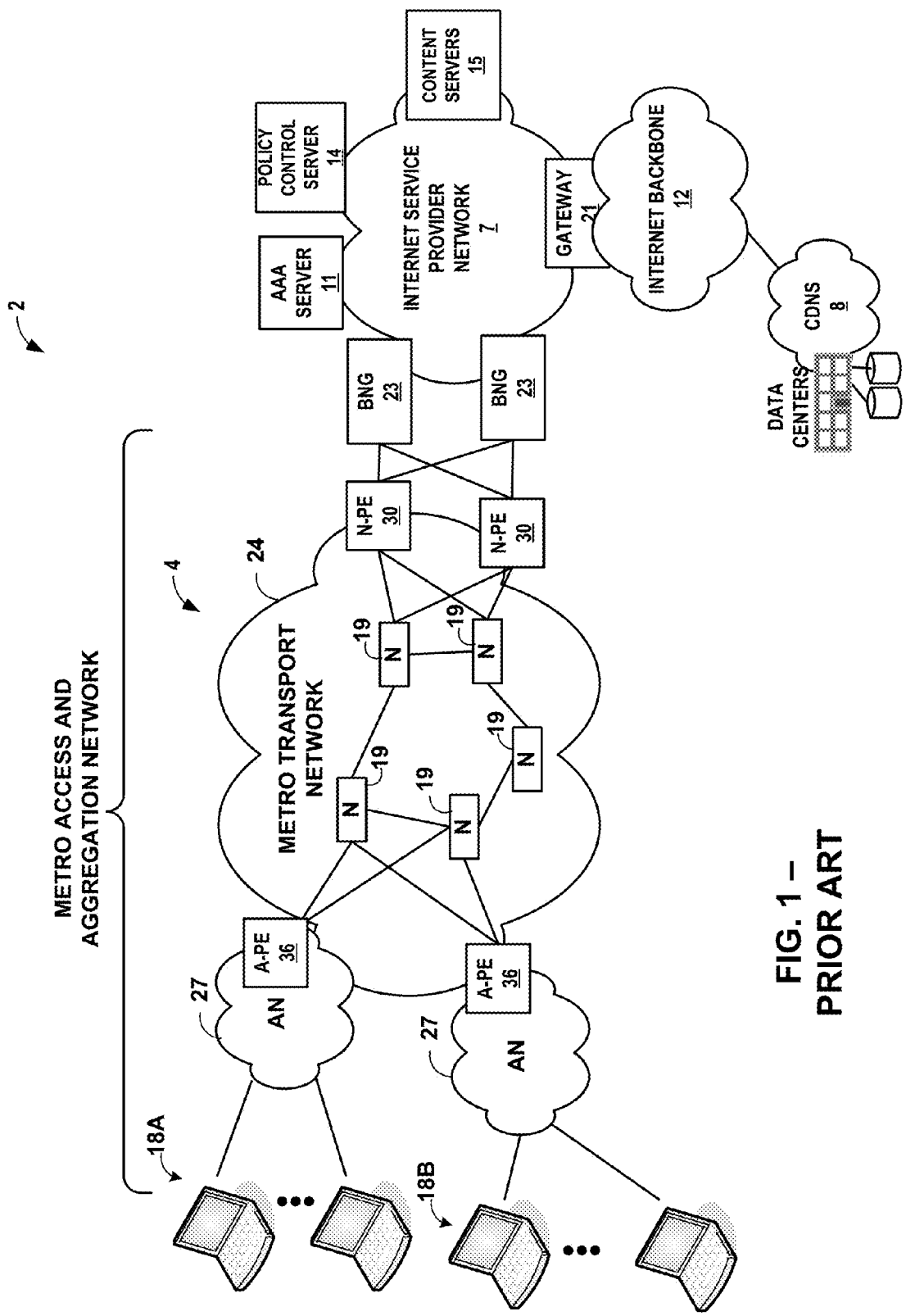
FIG. 1 is a block diagram illustrating an example prior art network system.

FIG. 1 is a block diagram illustrating an example network system 2 in accordance with techniques described herein. As shown in the example of FIG. 1, network system 2 includes a metro access and aggregation network 4 that is coupled to an Internet service provider network 7. In general, Internet service provider network 7 is typically owned by an Internet Service Provider (ISP) and operated as a private network that provides packet-based network services to subscriber devices 18A, 18B (herein, "subscriber devices 18"). Subscriber devices 18A may be, for example, personal computers, laptop computers or other types of computing devices associated with subscribers, e.g., Smart TVs, wireless-capable netbooks, video game devices, smart phones, personal data assistants (PDAs) or the like, connected to the network via a customer premise switch or a router (CPE). Each of subscriber devices 18 may run a variety of software applications, such as word processing and other office support software, web browsing software, software to support media streaming content from services such as Netflix and YouTube, software to support voice calls, video games, videoconferencing, and email, among others. That is, Internet service provider network 7 provides authentication and establishment of network access for subscriber devices 18 such that the subscriber device may begin exchanging data packets to retrieve content from content servers 15 of ISP 7 or from with one or more content data networks (CDNs) 8 by way of Internet backbone 12.

In general, content hosted and delivered to subscribers 18 by content servers 15 or CDN 8 may include, for instance, streaming media files, data files, software distribution, documents, and the like. Content may be delivered to subscribers 18 by a variety of services and protocols such as, for example, the hyper-text transfer protocol (HTTP), HTTP-based adaptive streaming, Real-Time Streaming Protocol (RTSP) streaming, other media streaming, peer-to-peer (P2P) protocols, file transfer protocol (FTP), and others. CDN 8 is typically a private network of interconnected devices that cooperate to distribute content to clients using one or more services. CDN 8 may include one or more data centers having data servers, web servers, application servers, databases, computer clusters, mainframe computers, and any other type of server, computing element, and/or database that may be employed by a content service provider to facilitate the delivery of content to subscriber devices 18 via Internet backbone 12 and Internet service provider network 7.

In the example of FIG. 1, metro transport network 24 provides layer two (L2) Ethernet switching transport services for network traffic associated with subscriber devices 18. Metro transport network 24 typically includes internal transport nodes ("N") 19, such as Ethernet switches and underlying transport systems for transporting, multiplexing and switching communications through high-speed links between access provider edge routers (A-PEs), 36 and network provider edge routers (N-PE) 30. Although, for simplicity, only a single Internet service provider network 7 is shown, metro transport network 24 may provide metro access, aggregation and transport of packets for subscriber devices 18 of a plurality of different Internet service providers. In general, metro transport network 24 is typically owned and operated by a metro carrier while each of Internet service provider networks 7 is own and operated by a separate (either administrative or legal separation) Internet service provider.

In this example of FIG. 1, A-PEs 36 operate at the border of metro transport network 24 and provide connectivity for access networks 27 respectively. In general, ANs 27 provide subscriber devices 18 and CPEs 18 with access to metro transport network 24. A-PEs 36, for example, typically include functionality to aggregate output from one or more endpoints associated with subscriber devices 18 into a higher-speed uplink to metro transport network 24. For example, subscriber devices 18 may connect to local customer premise equipment (CPE) such as DSL or cable modems, and A-PEs 36 may comprise digital subscriber line access multiplexers (DSLAMs) or other switching devices.

In general, subscriber devices 18/CPEs 18 are associated with customers of an Internet service provider that owns and operates Internet service provider network 7. As such, Internet service provider network 7 handles authentication and session establishment so as to provide network access to subscriber devices 18. Broadband network gateways (BNG) 23 provide routing and switching functions for connectivity to metro transport network 24 via N-PEs 30 and provide endpoints for and management of IP sessions established for subscriber devices 18. In another example, BNGs 23 may be a Broadband Remote Access Servers (BRASs) or other routing device that provide anchor points for subscriber sessions.

Upon authentication of a given subscriber device 18/CPE 18, Internet service provider network 7 allocates an IP address (public/internet routable or private) to the subscriber from the IP domain of the service provider and provides IP connectivity (L3) services for communication sessions associated with the subscribers. For example, AAA server 11 of service provider network 7 is typically an authentication, authorization and accounting (AAA) server to authenticate the credentials of a subscriber requesting a network connection. The AAA server 11 may be, for example, a Remote Authentication Dial-In User Service (RADIUS) server. As another example, AAA server 11 can be a DIAMETER server. Upon authenticating a network access request from a subscriber device 18, AAA server 11 assigns a layer three (L3) network address (e.g., an IPv4 or IPv6 network address) for receiving data services through Internet service provider network 7. Policy control server 14 represents a network device that provides a Policy Control and Charging Rules Function (PCRF) for subscriber devices 18.

In this way, layer two (L2) network transport functions and layer three (L3) network functions are generally split between metro transport network 24 and Internet service provider network 7 respectively. As one example, metro transport network 24 executes a Virtual Private Local Area Network Service (VPLS) or Ethernet Virtual Private Network (EVPN) Service that enables metro transport network 24 to operate as an L2 network that carries L2 traffic for subscriber devices 18 to BNGs 23. BNGs 23 perform L3 functionality, i.e., L3 address assignment and routing for subscriber devices 18 in the subscriber's respective Internet service provider, i.e., ISP network 7 in this example. For example, by executing the VPLS or EVPN E-LAN service, metro transport network 24 transports L2 communications, such as Ethernet packets across the transport network. More information concerning the use of VPLS can be found in RFC 4761 entitled "Virtual Private LAN Service (VPLS) Using BGP for Auto-Discovery and Signaling," dated January 2007, which is hereby incorporated by reference as if fully set forth herein. Similarly, more information about EVPN can be found in RFC 7432, incorporated herein. Reference to network layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

After authentication and establishment of network access through Internet service provider network 7, any one of subscriber devices 18 may begin exchanging data packets with CDNs 8. During this process, the IP addresses assigned by Internet service provider network 7 to subscriber devices 18 may be translated to public addresses associated with routing prefixes of Internet service provider network 7 for purposes of packet-based communication on Internet backbone 12. Moreover, gateway 21 provides layer three (L3) routing functions for reaching subscriber devices 18 through Internet service provider network 7. That is, gateway 21 advertises L3 reachability information (e.g., routes) for reaching the public address prefixes associated with Internet service provider network 7. Upon receiving the layer three (L3) routing information, autonomous system border routers (ASBRs) 30 update their respective routing tables with network layer reachability information for reaching address prefixes advertised by Internet service provider network(s) 7. As such, using L3 routing information for reaching subscriber devices 18 and without learning L2 network addresses for the subscribers, packet-based content provided by content servers 15 or CDNs 8 and addressed to subscriber devices 18 flows through Internet backbone 12 to Internet service provider network 7 for delivery to individual subscriber devices 18 by way of metro transport network 24 and access networks 27. Although not shown, Internet service provider network 7 may include other devices to provide other services, such as security services, load balancing, billing, deep-packet inspection (DPI), and other services for traffic traversing Internet service provider network 7.

Figure 2:
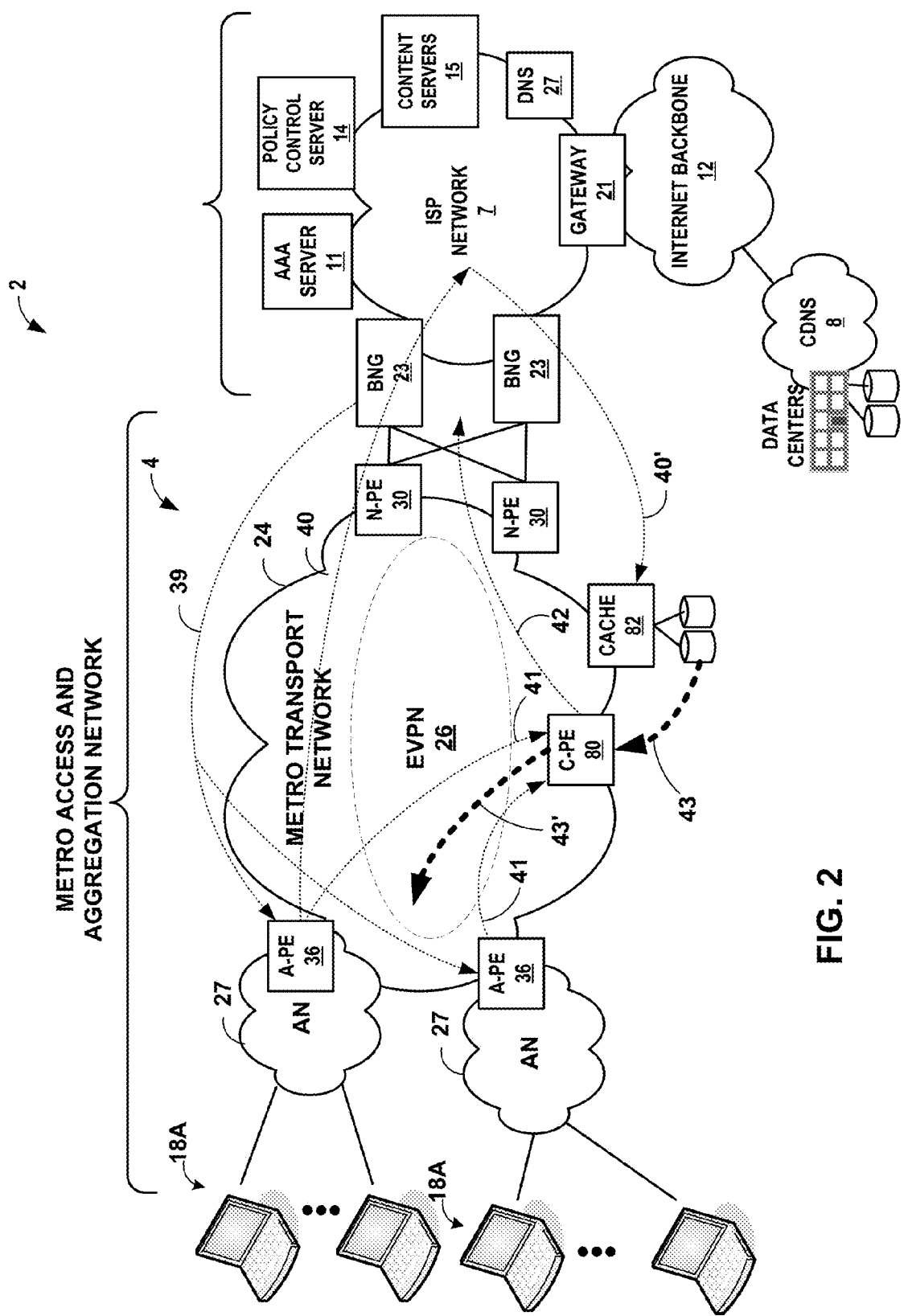
FIG. 2 is a block diagram illustrating an example network system in accordance with techniques described herein.

FIG. 2 is a block diagram illustrating an example network system in accordance with the techniques described herein. In particular, techniques are described that enable local caching of content data within metro transport network 24 for direct delivery to subscriber devices 18. This allows content servers of ISPs 7 or CDNs 8 to distribute cached content downstream to metro transport network 24 closest to subscriber devices 18, thereby improving subscriber experience and satisfaction.

As shown in FIG. 2, instead of implementing only a layer two (L2) emulation service for transporting traffic, such as VPLS, metro transport network 24 implements a virtual private network (EVPN) based layer 2 network to provide connectivity between subscriber devices 18 and Internet service provider network 7 even though the Internet service provider network 7 retains responsibility for authenticating subscriber devices 18 and assigning L3 network addresses to the subscribers.

In one example, metro transport network 24 implements an Ethernet Virtual Private Network (EVPN) 26. In general, edge routers of metro transport network 24 (e.g., A-PEs 36 and N-PEs 30) along with a newly introduced caching provide edge (C-PE) router 80 of metro transport network 24 operated by the metro transport carrier are configured to execute the EVPN protocol within their respective control planes (also referred to as routing engines) to communicate with each other and exchange configuration information necessary to establish and maintain EVPN 26. In an EVPN, L2 address learning (e.g., MAC learning) between the edge routers occurs in the control plane by exchanging EVPN messages according to the EVPN protocol, in contrast to traditional bridging that occurs in VPLS in which L2 address learning occurs in the data plane (i.e., forwarding components) while forwarding L2 traffic. For example, control planes of A-PEs 36, N-PEs 30 and C-PE 80 are configured to execute a routing protocol, such as the Border Gateway Protocol (BGP), to exchange enhanced messages so as to communicate with each other regarding EVPN 26. That is, control planes of A-PEs 36, N-PEs 30 and C-PE 80 may execute the BGP protocol to exchange BGP messages for MAC address signaling/learning as well as for access topology and VPN endpoint discovery with respect to EVPN 26. A-PEs 36, N-PEs 30 and C-PE 80 may be connected by an MPLS LSP infrastructure or may be connected by an IP infrastructure in which case IP/GRE tunneling or other IP tunneling can be used to transport L2 communications through EVPN 26. Additional information with respect to the EVPN protocol is described in "BGP MPLS Based Ethernet VPN," RFC 7432, Internet Engineering Task Force (IETF), the entire contents of which are incorporated herein by reference.

As shown in FIG. 2, metro transport network 24 has been configured to include at least one caching provider edge (C-PE) router 80 that is collocated with local cache 82 that stores cached content from content servers 15 or CDNs 8, thus allowing the cached content to be delivered from metro transport network 24 directly to the subscribers downstream within the access network from ISPs 7 responsible for authentication and layer three (L3) services for subscribers 18. As discussed above, C-PE router 80 is typically owned and operated by the metro carrier and participates in EVPN 26. Moreover, C-PE router 180 provides layer three (L3) peering relationships, e.g., by way of an external BGP (E-BGP) routing session 42 or by way of static routing, for sharing L3 reachability information of metro transport network 24 with L3 routers of ISPs 7, such as BNGs 23. In particular, as described above, C-PE 80 participates in EVPN 26. For example, the control plane of C-PE 80 is configured to execute the BGP and EVPN protocols so as to participate in EVPN 26. As such, C-PE 80 provides a logical access point for EVPN 26 such that communications for delivery of cached content from cache 82 to subscriber devices 18 can be transported directly from C-PE 80 to A-PEs 36 and C-PE 80 over metro transport network 24.

Moreover, although authentication of subscriber devices 18 and allocation of L3 network addresses to the subscribers is still performed by Internet service provider network 7, the Internet service provider(s) and metro carrier operator arrange to have the network address information (e.g., respective address prefixes owned by the ISPs or IP address/MAC address combinations to be used by subscriber devices) advertised by A-PEs 36 of the metro carrier instead of, or in addition to, the typical routing protocol advertisement of those prefixes from gateway 21 of Internet service provider network 7 to Internet backbone 12. In one example, A-PEs 36 are programmed by the metro carrier with data specifying the IP address prefixes of any of the Internet service provider networks 7 for which the ISP has agreed to participate in the fast path offloading techniques described herein. For example, an administrator for the metro carrier may input a list, file or other data structure specifying the IP address prefixes of the ISP or MAC/IP addresses to be advertised by the A-PEs. In another example, BNGs 23 of the agreeing ISPs may be configured to leak or otherwise communicate the layer three address subnets (prefixes) allocated to and owned by the ISP to A-PEs 36. For example, a protocol executing within control planes of Ns 19 may output messages 39 to selectively communicate to A-PEs 36 the network address information assigned to the corresponding Internet service provider network 7 and utilized for subscriber devices 18. Example protocols that may be used include the HTTP protocol, an enhanced routing protocol such as BGP, or even a proprietary protocol.

In response, the routing protocols executing within the control planes of A-PEs 36 update respective routing tables to the associated ISP address prefixes with subscriber devices 18 reachable through local interface ports. Moreover, the routing protocols of A-PEs 36 are configured to output EVPN messages 41 to advertise the layer three prefixes or IP addresses/MAC address combinations into EVPN 26 on behalf of Internet service provider network 7, where the EVPN messages 41 announce that the IP addresses allocated from the IP prefixes used by Internet service provider network 7 to provide IP services to subscriber devices 18 are actually reachable through the A-Pes. As one example, A-PEs 36 may construct EVPN messages 41 as an IP Prefix Advertisement route (i.e., Route Type 5) of a BGP EVPN, as defined by "IP Prefix Advertisement in EVPN," draft-ietf-bess-evpn-prefix-advertisement-01, Internet Engineering Task Force (IETF), Mar. 9, 2015, the entire contents of which are incorporated herein by reference. Additionally, A-PEs 36 may construct EVPN messages 41 as a MAC+IP address Advertisement route (i.e., Route Type 2) of a BGP EVPN, as defined by "MAC/IP Advertisement in EVPN," RFC 7432, Internet Engineering Task Force (IETF), the entire contents of which are incorporated herein by reference. In this way, as a member of EVPN 26, C-PE router 80 learns the L3 address prefixes or IP addresses associated with subscriber devices 18 and reachable through A-PEs 36 via EVPN 26.

Moreover, C-PE router 80 communicates reachability of cache 82 to ISP network 7 through routing protocol peering session 42, which may be a BGP peering session between the control places of C-PE router 80 and BNGs 23. In this way, ISP network 7 learns of the direct access path to local caching within metro transport network 24 and, in particular, associates C-PE 80 as the forwarding next hop for reaching cache 82. In many deployments, content servers 15 of ISP network 7 and/or CDNs 8 typically have infrastructure for pre-distribution of content. As such, content servers 15 or CDNs 8 may utilize the reachability information learned from C-PE 80 to pre-load cache 82 with cached content, thereby providing a local, efficient distribution mechanism for delivery of content to subscribers 18. Although for purposes of example, C-PE 80 is described as advertising reachability of cached content to the metro transport network, the content reachability can be advertised by any other router(s). In that case, requests for content will reach the cache via that other router(s).

In example operations, subscriber devices 18 output content requests 40 to request content from content servers 15 or CDNs 8, typically by a unique identifier such as a Universal Resource Locator (URL), e.g., www.contentservice.com. In response, Domain Name Service (DNS) server 27 or, alternatively content servers 15, operate to resolve content requests 40 to cache 82 of metro transport network based on the reachability information advertised by C-PE 80. In this way, ISP network 7 redirects content requests 40 to cache 82 by way of C-PE 80 as content requests 40'. In response, cache 82 outputs cached content 43 toward subscribers 18 via C-PE as the next hop for reaching the subscribers. In turn, C-PE utilizes the reachability information for subscribers 18, as learned by EVPN messages 41, to inject cached content 43 into EVPN 26 as EVPN packets 43' for transport to one or more of A-PEs 36 based on the address prefixes advertised in the EVPN by the A-PEs 36. A-PEs 36 receive the content from EVPN 26, de-encapsulate the content from the transport layer EVPN packets and forward IP packets encapsulating the content to subscriber devices 18.

Figure 3:
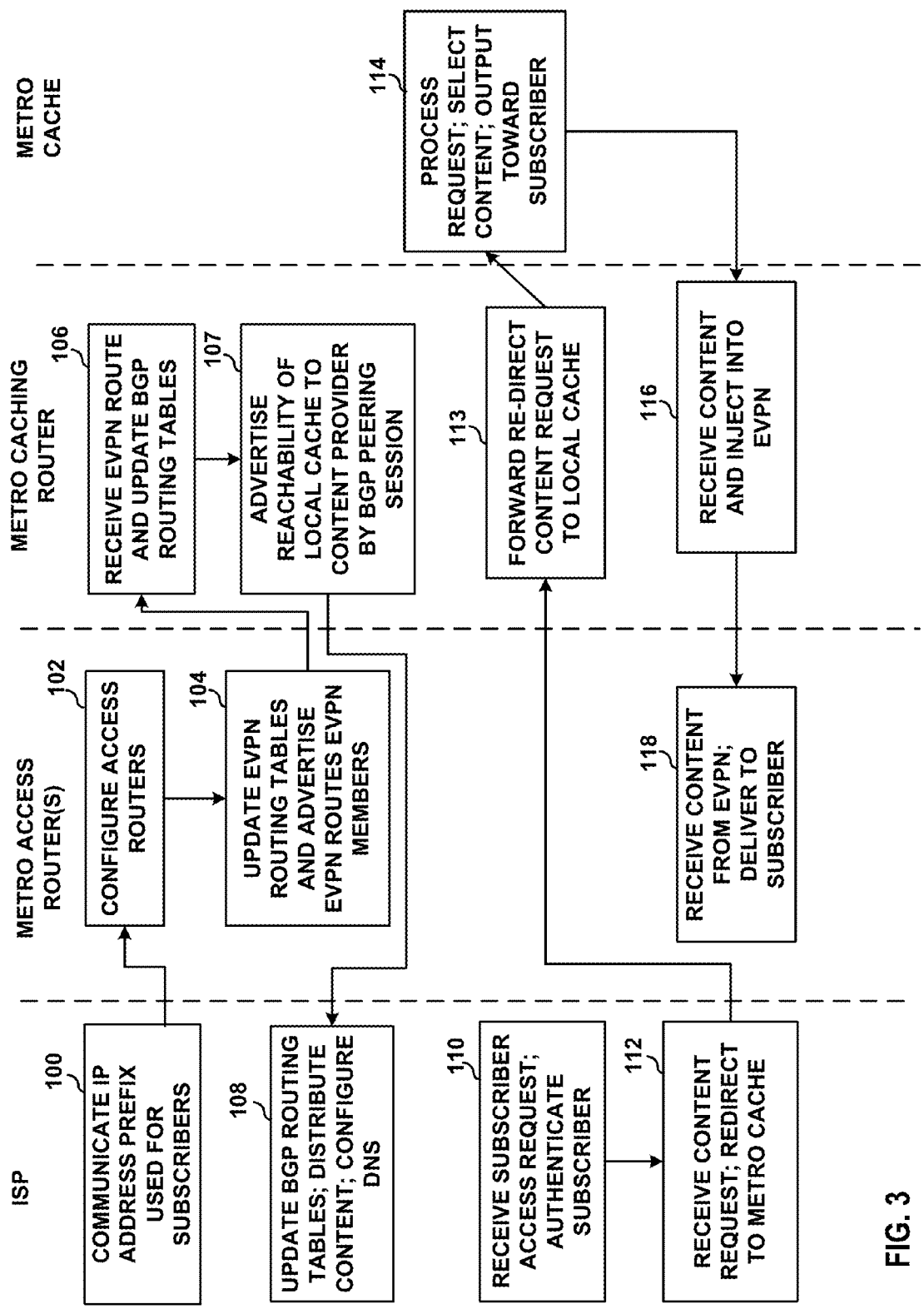
FIG. 3 is a block diagram illustrating further details of an example router in accordance with techniques of the disclosure.

FIG. 3 is a flowchart illustrating example operation of a network system in accordance with the techniques described herein. Initially, address prefixes owned by the ISP are communicated to the metro carrier for configuration of the access provider edge routers, such as A-PEs 36 (100, 102). As explained above, A-PEs 36 may be programmed by the metro carrier with network address information from the Internet Service Provider networks, such as data specifying the IP address prefixes of any of the Internet service provider networks 7 for which the ISP has agreed to participate in the fast path offloading techniques described herein. As other examples, BNGs 23 of the agreeing ISPs may output messages 39 to selectively communicate to A-PEs 36 the one or more public IP address prefixes assigned to the corresponding Internet service provider network 7 and utilized for subscriber devices 18. As another example, BNGs 23 may output to A-PEs 36 one or more MAC/IP address combinations on behalf of the Internet Service Provider network 7.

Next, A-PEs 36 update their respective routing tables to the associated ISP address prefixes with subscriber devices 18 reachable through local interface ports and output EVPN messages 41 to advertise the layer three prefixes into EVPN 26 on behalf of Internet service provider network 7, where the EVPN messages 41 specify routes to prefixes used by Internet service provider network 7 to provide IP services to subscriber devices 18 are actually reachable through the A-PEs (104). Alternatively, A-PEs 36 may construct EVPN messages 41 as a MAC+IP address Advertisement route (i.e., Route Type 2) of a BGP EVPN to communicate one or more MAC/IP address combinations on behalf of the Internet Service Provider network 7.

As a member of EVPN 26, C-PE router 80 receives the EVPN route advertisement announcing the L3 address prefixes associated with subscriber devices 18 and reachable through A-PEs 36 via EVPN 26, such as by an EVPN Type 5 routing advertisement that advertises IP prefixes rather than L2 MAC addresses of the subscribers or an EVPN Type 2 MAC+IP route advertisement (106). In response, C-PE router 80 updates a BGP routing table on the C-PE 80 router. In addition, C-PE router 80 communicates L3 reachability information of local cache 82 to ISP network 7 by constructing and outputting, in this example, BGP messages through routing protocol peering session 42 (107).

Upon receiving the BGP message through peering session 42, L3 routers with the ISP (e.g., BNGs 23) update their BGP routing tables to associate C-PE 80 as next hops for reaching local cache 82 within metro transport network 24 for distributing content to subscriber devices 18 directly from metro transport network 24 downstream (closer to subscribers 18) from Internet service provider network 7 (108). Based on the reachability information, content servers 15 and other infrastructure of ISP network 7 communicate content to cache 82 via C-PE 80 so as to pre-load the content within the local cache 82 of metro access network 24 (108). As another example, CDNs 8 may similarly learn that local cache 82 of metro transport network 24 is reachable via C-PE 80 and pre-load content to the cache.

Upon receiving a network access request from a given subscriber device 18, AAA server 11 of Internet service provider network 7 authenticates the subscriber and allocates an IP address for the subscriber from the IP address prefix assigned to and owned by the ISP (110). Thus, network communications are enabled to flow from the subscriber through the subscriber session over the switching mechanisms provided by metro transport network 24 and the L3 services and routing functions provided by Internet service provider network 7 to Internet backbone 12 and CDNs 8. As such, any of content servers 15 or DNS 27 of ISP network 7 may receive a content request 40 from a given subscriber 18 (112). Upon receiving content requests from subscriber devices 18, content servers 15 or DNS 27 process the content requests and resolve content requests 40 to cache 82 of metro transport network as content requests 40' based on the reachability information advertised by C-PE 80 (112). In this example, content servers 15 or DNS 27 may be viewed as operating as reverse proxies so as to redirect content request downstream to local cache 82 of metro transport network 24 closer to subscribers 18. In this way, unlike conventional metro transport networks operating L2 access networks between subscribers and ISPs, the techniques herein enable distribution of content to caches located closer to subscribers 18 and downstream of ISP networks 7.

Upon receipt of the redirected content request 40' from ISP network 7, C-PE 80 routes the request to local cache 82 (113). In response, cache 82 processes the content request to retrieve the identified content, if available, and outputs the cached content 43 toward subscribers 18 via C-PE as the next hop for reaching the subscribers (114). For example, local cache 82 may output HTTP messages, RTP messages or other communications for conveying the requested content to the requesting subscriber 18. In turn, C-PE 80 utilizes the reachability information for subscribers 18, as learned by EVPN messages 41, to encapsulate cached content 43 and inject the cached content into EVPN 26 as EVPN packets 43' for transport to one or more of A-PEs 36 based on the address prefixes advertised in the EVPN by the A-PEs 36 (116). A-PEs 36 receive the content from EVPN 26, de-encapsulate the content from the transport layer EVPN packets and forward IP packets encapsulating the content to subscriber devices 18 (118)

Figure 4:
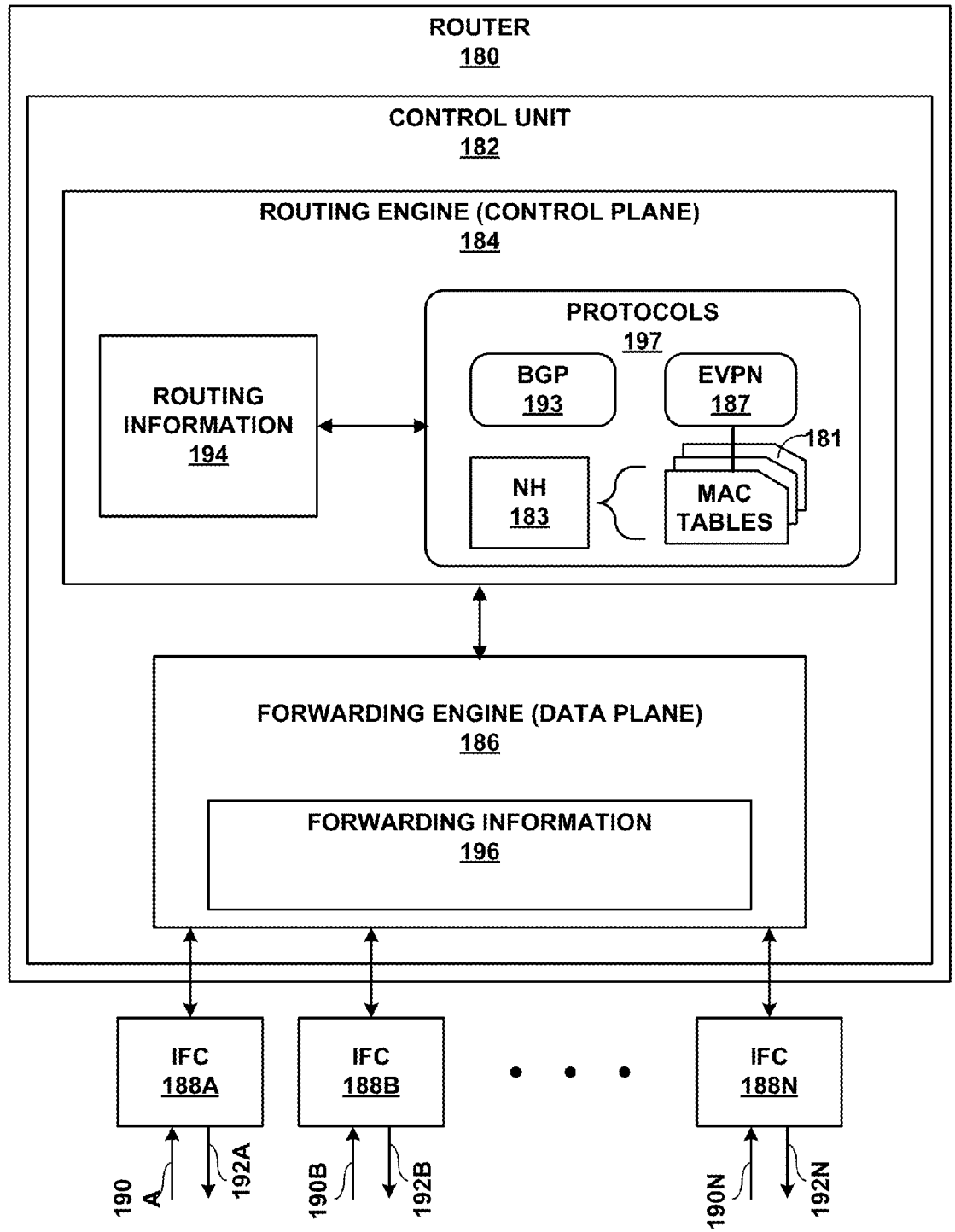
FIG. 4 is a flowchart illustrating example operations of multiple network devices in accordance with techniques of the disclosure.

FIG. 4 is a block diagram illustrating an exemplary router 180 capable of performing the disclosed techniques. In general, router 180 may operate substantially similar to A-PEs 36, N-PEs 30 or C-PEs 80 as described with respect to FIGS. 2-3.

In this example, router 180 includes interface cards 188A-88N ("IFCs 188") that receive packets via incoming links 190A-190N ("incoming links 190") and send packets via outbound links 192A-192N ("outbound links 192"). IFCs 188 are typically coupled to links 190, 192 via a number of interface ports. Router 180 also includes a control unit 182 that determines routes of received packets and forwards the packets accordingly via IFCs 188.

Control unit 182 may comprise a routing engine 184 and a packet forwarding engine 186. Routing engine 184 operates as the control plane for router 180 and includes an operating system that provides a multi-tasking operating environment for execution of a number of concurrent processes. Routing engine 184, for example, executes software instructions to implement one or more control plane networking protocols 197. For example, protocols 197 may include one or more routing protocols, such as Border Gateway Protocol (BGP) 193, for exchanging routing information with other routing devices and for updating routing information 194. Routing information 194 may describe a topology of the computer network in which router 180 resides, and may also include routes through the network. Routing information 194 describes various routes within the computer network, and the appropriate next hops for each route, i.e., the neighboring routing devices along each of the routes. Routing engine 184 analyzes stored routing information 194 and generates forwarding information 196 for forwarding engine 186. Forwarding information 196 may associate, for example, network destinations for subscribers with specific next hops and corresponding IFCs 188 and physical output ports for output links 192. Moreover, forwarding information 196 may specify operations, such as encapsulation with EVPN assigned labels or de-encapsulation of packets, to be applied when forwarding packets to the next hops. Forwarding information 196 may be a radix tree programmed into dedicated forwarding chips, a series of tables, a complex database, a link list, a radix tree, a database, a flat file, or various other data structures.

In the example of FIG. 4, routing engine 184, also referred to as a control plane for router 180, executes EVPN protocol 187, which operates to communicate with other routers to establish and maintain an EVPN, such as the EVPN 26, for transporting communications through metro transport network 24 so as to logically extend an Ethernet network through the intermediate network. EVPN protocol 187 may, for example, communicate with EVPN protocols executing on remote routers to establish tunnels (e.g., LSPs or GRE or other tunneling mechanisms such as VXLAN) that utilize appropriate tunneling mechanism on packets for transporting the packets through the EVPN enabled metro network. EVPN protocol 187 maintains MAC address tables 181 in the control plane of router 180, where the MAC tables associate L2 customer MAC addresses with specific tunnels for reaching the associated MAC address. When implementing an EVPN, L2 MAC+IP address learning may be performed in the control plane by exchanging, with remote PE devices, BGP messages containing customer MAC+IP addresses. EVPN protocol 187 communicates information recorded in MAC tables 181 to forwarding engine 186 so as to configure forwarding information 196. In this way, forwarding engine 186 may be programmed with associations between each tunnel and output interface and specific source customer MAC addresses reachable via those tunnels. Additional example information with respect to the EVPN protocol is described in "BGP MPLS Based Ethernet VPN," RFC 7432 the entire contents of which are incorporated herein by reference.

In addition, as described herein, BGP protocol 193 may receive IP Prefix Advertisement routes (i.e., Route Type 5) of a BGP EVPN 26. Upon receiving this type of L3 route advertisement for the EVPN, BGP protocol 193 may output updates routing information 194 and advertises the routes through any BGP peering relationship, such as BGP session 42. Moreover, BGP protocol 193 forwards the L3 information to EVPN protocol 187, which updates forwarding information 196 associated with EVPN 26 to specify the appropriate next hop and encapsulation information necessary for tunneling packets destined to the L3 prefix through the EVPN.

The architecture of router 180 illustrated in FIG. 4 is shown for exemplary purposes only. The invention is not limited to this architecture. In other examples, router 180 may be configured in a variety of ways. In one example, some of the functionally of control unit 182 may be distributed within IFCs 188. In another example, control unit 182 may comprise a plurality of packet forwarding engines operated as slave routers.

Control unit 182 may be implemented solely in software, or hardware, or may be implemented as a combination of software, hardware, or firmware. For example, control unit 182 may include one or more processors which execute software instructions. In that case, the various software modules of control unit 182 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:

establishing an Ethernet Virtual Private Network (EVPN) within a metro transport network positioned between at least one Internet service provider network and a set of subscriber devices, wherein the metro transport network provides layer two (L2) packet switching for transporting network packets between the Internet service provider network and the subscriber devices, wherein the Internet service provider network authenticates the subscriber devices and allocates the subscriber devices respective Internet Protocol (IP) network addresses from an IP network address prefix assigned to the Internet service provider network, and wherein the EVPN is established within the metro transport network by at least one access router that is connected to the subscriber devices by one or more access links and by at least one caching router that is coupled to a local content cache of the metro transport network;

receiving, by the caching router of the EVPN and from the access router, an EVPN route advertisement that advertises network address reachability information of the subscriber devices on behalf of the Internet service provider network, wherein the EVPN route advertisement indicates that the subscriber devices are reachable through the access router;

outputting a routing protocol route advertisement that advertises the network address reachability information of the local content cache of the metro transport network to a router of the Internet service provider network; and responsive to content requests redirected from the Internet service provider network and based on the EVPN router advertisement from the access router, forwarding, with the caching router of the metro transport network and by the EVPN, content from the local content cache to the access routers for delivery to one or more of the subscribers.

2. The method of claim 1, wherein forwarding content from the local content cache to the one or more subscribers comprises:

receiving, with the caching router of the metro transport network and from the local content cache, packets addressed to one or more of the subscriber devices;

encapsulating, with the caching router, the packets and tunneling the packets through the EVPN-enabled metro transport network from the caching router to the access router for de-encapsulation and forwarding the packets to the one or more subscriber devices.

3. The method of claim 1, wherein receiving an EVPN route advertisement that advertises the network address reachability information of the subscriber devices comprises receiving a routing protocol message of Route Type 5 carrying the IP network address prefix or of Route Type 2 carrying MAC addresses and IP addresses of the subscribers.

4. The method of claim 1, further comprising outputting, from a gateway router of the Internet service provider network, a message that specifies to the access router of the metro transport network the IP address prefix to be advertised by the access router on behalf of the Internet service provider network.

5. The method of claim 4, wherein the message comprises a Border Gateway Protocol (BGP) routing protocol message that has been enhanced to specify the network address reachability information to be advertised by the access router.

6. A system comprising:

a metro transport network positioned between a set of subscriber devices and at least one Internet service provider network that authenticates the subscriber devices and allocates the subscriber devices respective layer three (L3) addresses from a respective Internet Protocol (IP) network address prefix assigned to the Internet service provider network, wherein the metro transport network provides layer two (L2) packet switching for transporting network packets between the Internet service provider network and the subscriber devices, wherein the metro transport network comprises at least one access router that is connected to the subscriber devices by one or more access links and at least one caching router that is coupled to a local content cache of the metro transport network;

wherein the access router and the caching router establish an Ethernet Virtual Private Network (EVPN) within the metro transport network, wherein the access router outputs, within the EVPN and to the caching router, an EVPN route advertisement that advertises network address reachability information of the subscriber devices on behalf of the Internet service provider network, wherein the caching router of the metro transport network outputs a routing protocol route advertisement that advertises the network address reachability information of the local content cache of the metro transport network to a router of the Internet service provider network, and wherein, responsive to content requests redirected from the Internet service provider network and based on the EVPN route advertisement from the access router, the caching router of the metro transport network forwards, by the EVPN, content from the local content cache to the access routers for delivery to the one or more of the subscribers.

7. The system of claim 6, wherein the caching router of the metro transport network is configured to forward the content by encapsulating packets addressed to the one or more subscribers and tunnel the packets through the EVPN-enabled metro transport network from caching router to the access router for de-encapsulation and delivery to the one or more subscriber devices.

8. The system of claim 6, wherein the access router is configured to output the EVPN route advertisement by constructing and outputting a Border Gateway Protocol (BGP) routing protocol message of Route Type 5 carrying the IP network address prefix or Route Type 2 carrying a MAC/IP address combination.

9. The system of claim 6, further comprising a gateway router of the Internet service provider network configured to output a message to the access router of the metro transport network that specifies the network address reachability information of the subscriber devices to be advertised by the access router on behalf of the Internet service provider network.

10. The system of claim 9, wherein the message comprises a Border Gateway Protocol (BGP) routing protocol message that has been enhanced to specify the network address reachability information to be advertised by the access router.

11. A caching router of a metro transport network positioned between at least one Internet service provider network and a set of subscriber devices, the router comprising:
a control unit having at least one processor coupled to a memory,
wherein the control unit executes software configured to establish an Ethernet Virtual Private Network (EVPN) with one or more access routers within the metro transport network, and
wherein the control unit is configured to receive, from the access routers, EVPN route advertisements specifying network address reachability information on behalf of the Internet service provider network,
wherein the EVPN route advertisement specifies the network address reachability information of the subscriber devices and indicates that the subscriber devices of the Internet service provider network are reachable through the access router,
wherein the caching router of the metro transport network outputs a routing protocol route advertisement that advertises, to a router of the Internet service provider network, network address reachability information of a local content cache of the metro transport network, and
wherein, responsive to content requests redirected from the Internet service provider network, the caching router of the metro transport network forwards, by the EVPN, content from the local content cache to the access routers for delivery to the one or more of the subscribers.

12. The caching router of claim 11, wherein the caching router is configured to receive the the EVPN route advertisements as Border Gateway Protocol (BGP) routing protocol messages of Route Type 5 carrying the L3 network address prefix or of Route Type 2 carrying a MAC/IP address combination.

* * * * *